(12) United States Patent
Fintescu et al.

(10) Patent No.: US 8,408,864 B2
(45) Date of Patent: Apr. 2, 2013

(54) DEVICE FOR REGULATING THE FLOW RATE OF AIR FEEDING A TURBINE VENTILATION CAVITY OF A TURBOMACHINE TURBINE SECTION

(75) Inventors: Ion Fintescu, Paris (FR); Laurent Gille, Dammarie les Lys (FR); Jean-Pierre Andre Joseph Mourlan, Nogent sur Marne (FR); Matthieu Savarit, Antony (FR)

(73) Assignee: SNECMA, Paris (FR)

( * ) Notice: Subject to any disclaimer, the term of this patent is extended or adjusted under 35 U.S.C. 154(b) by 698 days.

(21) Appl. No.: 12/615,798

(22) Filed: Nov. 10, 2009

(65) Prior Publication Data

US 2010/0119356 A1      May 13, 2010

(30) Foreign Application Priority Data

Nov. 12, 2008  (FR) ...................... 08 57642

(51) Int. Cl.
*F01B 25/02*        (2006.01)

(52) U.S. Cl. .................... 415/28; 137/512.1; 137/513.5; 415/144; 415/146

(58) Field of Classification Search ............... 137/512.1, 137/513.5; 138/46
See application file for complete search history.

(56) References Cited

U.S. PATENT DOCUMENTS

| | | | |
|---|---|---|---|
| 2,934,084 A | 4/1960 | Adams | |
| 5,993,149 A | 11/1999 | Smed | |
| 6,412,514 B1 * | 7/2002 | Raftis | ............. 137/111 |
| 6,851,255 B2 * | 2/2005 | Aitchison et al. | ............. 60/39.83 |
| 2007/0003410 A1 * | 1/2007 | Chehab | ....................... 415/173.1 |
| 2009/0175718 A1 * | 7/2009 | Diaz et al. | ....................... 415/180 |

FOREIGN PATENT DOCUMENTS

| | | |
|---|---|---|
| EP | 1 319 806 A2 | 6/2003 |
| EP | 1 610 606 A1 | 12/2005 |
| GB | 1076671 | 7/1967 |
| GB | 2 046 363 A | 11/1980 |
| GB | 2 073 404 A | 10/1981 |
| WO | WO 2004/055338 A1 | 7/2004 |

* cited by examiner

*Primary Examiner* — Nathaniel Wiehe
*Assistant Examiner* — Justin Seabe
(74) *Attorney, Agent, or Firm* — Oblon, Spivak, McClelland, Maier & Neustadt, L.L.P.

(57) ABSTRACT

A device for regulating the flow rate of air feeding a turbine ventilation cavity of a turbomachine turbine section is disclosed. The device includes at least one tubular duct opening into a take-off cavity and leading into a turbine ventilation cavity, the pressure inside the take-off cavity being higher than the pressure inside the turbine ventilation cavity; an air flow rate regulation valve disposed in the tubular duct, the valve being suitable for moving under the effect of the pressure difference between the take-off cavity and the turbine ventilation cavity; and a mechanical return device for holding the valve in a maximum closure position for the duct so long as the pressure difference between the take-off cavity and the turbine ventilation cavity remains below a predetermined threshold pressure.

6 Claims, 3 Drawing Sheets

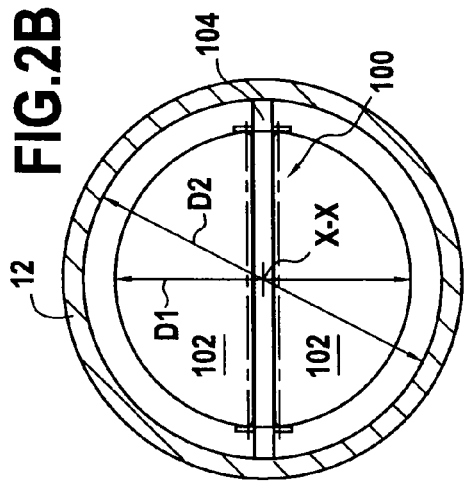
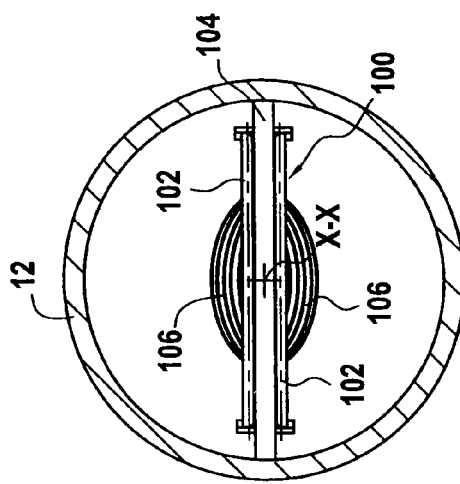
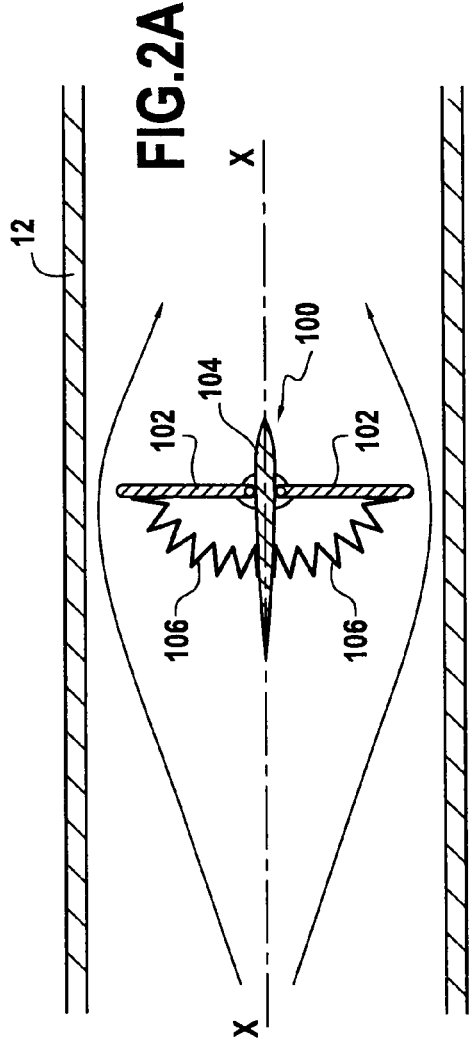
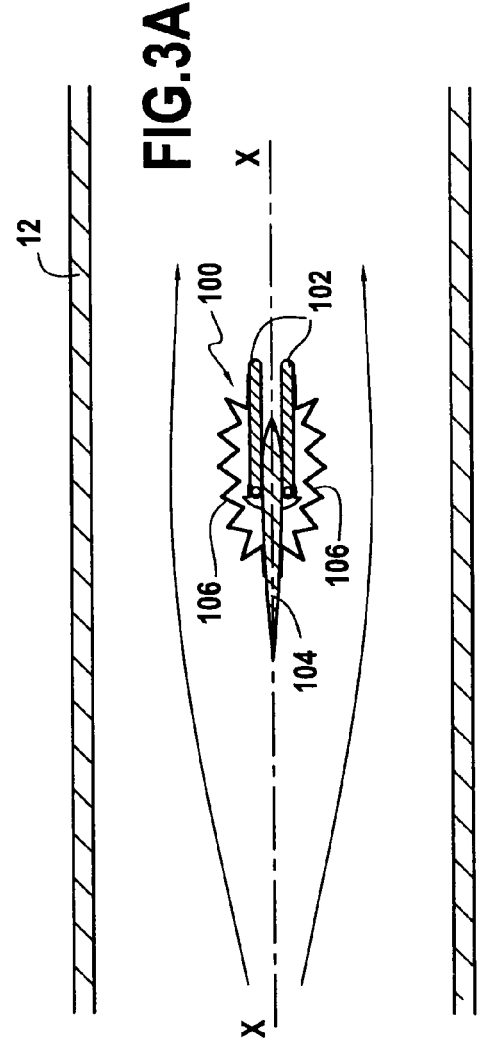

DEVICE FOR REGULATING THE FLOW RATE OF AIR FEEDING A TURBINE VENTILATION CAVITY OF A TURBOMACHINE TURBINE SECTION

BACKGROUND OF THE INVENTION

The invention relates to the general field of ventilating a turbine section of a turbomachine. The invention relates more particularly to a device for regulating the flow rate of air for feeding to a turbine ventilation cavity in a turbine section of an aviation turbomachine.

In the present description, the term "ventilating" is used in respect of a turbine section to cover both a function of cooling the various vanes and/or blades of the turbine section, and a purging function to prevent hot air in the primary flow passage through the turbine from being reintroduced elsewhere.

When an aviation turbomachine is operating at high speed (typically at full throttle), the temperatures of the gases flowing in the primary flow passage of the turbomachine reach values that cannot be withstood without damage by the parts situated outside said passage, in particular parts situated around the turbine section(s) of the turbomachine (low pressure turbine and/or high pressure turbine). It is thus essential to prevent the gas stream that is flowing in the primary flow passage from penetrating outside that passage when the turbomachine is operating at high speeds.

For this purpose, it is known to feed compressed air to a cavity (referred to herein as the turbine ventilation cavity) that is formed around the outer casing of the turbine and that communicates with the flow passage for the gas stream through the turbine section(s), the compressed air being fed via a circuit comprising a series of orifices and bushings. Since the air in the turbine ventilation cavity is taken from a compressor state of the turbomachine, the turbine ventilation cavity is at a pressure that is higher than that existing in the flow passage for the gas stream through the turbine. As a result, the compressed air penetrating into the flow passage via the air insertion orifices serves to keep the gas stream that is flowing through the turbine sections confined inside the flow passage. The turbine is then said to be properly purged. The compressed air present in the turbine ventilation cavity is also used for cooling certain parts of the turbine, such as for example the first nozzle of the low pressure turbine (for a turbomachine of two-spool architecture).

The air in the turbine ventilation cavity is generally conveyed by tubular ducts connecting the turbine ventilation cavity to a take-off cavity that communicates with the flow passage for the stream of air passing through the compressor of the turbomachine. Diaphragms may be located inside these ducts in order to calibrate the flow rate of the air that is taken off. A check valve may also be located inside each duct at its end leading into the turbine ventilation cavity. In the event of the duct accidentally breaking and the pressure inside it dropping, the check valve prevents the gas stream flowing in the primary passage of the turbine from escaping therefrom. Reference can be made to document EP 1 312 763 that describes an embodiment of a check valve.

Nevertheless, taking compressed air to deliver it to the turbine ventilation cavity via ducts provided with flow rate calibration diaphragms as described above, does not enable the flow rate of the air that is taken off to be regulated as a function of the operating speed of the turbomachine. Since the diaphragms disposed in the ducts are of constant flow section, the air take-off flow rate is substantially constant for the various operating speeds when expressed as a percentage of the flow rate of air flowing in the primary passage of the compressor. It is thus common practice for the diaphragms to be dimensioned so as to enable air to be taken off at a flow rate that is sufficient to ventilate turbines (i.e. purge them and cool parts thereof) when the turbine is operating at high speed (such as full throttle). In flight at a lower speed of operation, where temperature levels in the turbomachine are not so high (such as when cruising), a smaller air flow rate would be sufficient for ventilating the turbines, so as a result too much air is taken off during such speeds of operation. Unfortunately, the air that is taken from the compressor and reintroduced further downstream into the turbine at a location where the pressure level is lower does less work in the turbine than it would have done if it had not been taken off. This has the consequence of penalizing fuel consumption. In order to optimize fuel consumption, it is therefore desirable to minimize air take-off from the compressor at each of the operating points of the turbomachine.

OBJECT AND SUMMARY OF THE INVENTION

A main object of the present invention is to mitigate such drawbacks by proposing to regulate the flow rate of air for feeding to the turbine ventilation cavity as a function of the operating point of the turbomachine.

This object is achieved by a device for regulating the flow rate of air feeding a turbine ventilation cavity of a turbomachine turbine section, the device comprising:

at least one tubular duct opening out at one end into a take-off cavity communicating with a flow passage for a stream of air in a compression section of the turbomachine and leading at an opposite end into a turbine ventilation cavity that communicates with a flow passage for a gas stream in a turbine section of the turbomachine, the pressure inside the take-off cavity being higher than the pressure inside the turbine ventilation cavity;

a flow rate regulation valve disposed in the tubular duct, suitable for moving under the effect of the pressure difference between the take-off cavity and the turbine ventilation cavity between a maximum closure position for the duct in which some minimum air flow rate passes through the valve and a minimum closure position for the duct in which a maximum air flow rate passes through the valve; and mechanical return means for holding the valve in its maximum closure position for the duct so long as the pressure difference between the take-off cavity and the turbine ventilation cavity remains below a predetermined threshold pressure.

The mechanical return means of the device of the invention and the predetermined threshold pressure are advantageously dimensioned so as to obtain:

maximum closure for the duct at cruising speeds so that the ventilation flow rate is just sufficient to provide purging and turbine vane cooling, for the purpose of optimizing fuel consumption; and minimum closure for the duct at full throttle where temperature levels are the highest in the primary passage so that the ventilation flow rate is expressed as a percentage of the flow rate of air in the take-off passage is at a maximum, this being made possible by higher pressure levels and in particular by greater pressure differences between the take-off cavity and the turbine ventilation cavity than at cruising speed.

When the threshold pressure is predetermined to be set at cruising speed, the valve remains in its maximum closure position for the duct up to cruising speed, and at higher speeds the closure of the duct becomes smaller with minimum closure being obtained for the duct at full throttle. Closure between cruising and full-throttle speeds can thus take place progressively or else almost instantaneously between the maximum and minimum closure positions.

Thus, while flying at cruising speed, a minimum flow rate of air passes through the valve and feeds the turbine ventilation cavity, this minimum flow rate being calibrated to provide sufficient purging and where appropriate sufficient cooling of the turbine vanes when the turbomachine is operating at such speeds. Likewise, while flying at full throttle, a maximum flow rate of air passes through the valve and feeds the turbine ventilation cavity, this maximum flow rate being calibrated to ensure effective purging and cooling of the turbine vanes at such operating speeds of the turbine. Nevertheless, the threshold pressure may be set for a speed of operation other than cruising speed. In particular, it may be zero, which means that the amount of closure for the duct begins to be reduced as soon as the turbomachine starts.

As a result, the device of the invention serves to regulate the flow rate of air for providing ventilation of a turbine section as a function of the operating point of the turbomachine. This results in optimized take-off of air from the compressor. For a given thrust level, fuel consumption can be reduced compared with a prior art take-off device. More precisely, for a two-spool bypass turbomachine, the savings in terms of specific consumption are estimated at around 0.3%.

The device of the invention also presents the advantage of being of simple and reliable design, of not requiring any particular power supply circuit, and above all of presenting very low weight.

In an advantageous disposition, the device further includes means for completely closing the duct when the pressure inside the duct becomes significantly lower than the pressure inside turbine ventilation cavity. Such means make it possible, in the event of the duct being accidentally broken, to prevent the gas stream flowing in the primary flow section of the turbine escaping therefrom.

The flow rate regulation valve may present the form of a disk centered on the longitudinal axis of the duct, the valve being made up of two half-disks with their diameters pivotally mounted on a rigid shaft that is secured to the duct and that extends transversely across the duct, the half-disks being suitable for deploying into a plane extending substantially transversely across the duct when the valve is in its maximum closure position for the duct and of retracting into a substantially longitudinal plane of the duct when the valve is in its minimum closure position for the duct.

In an embodiment, each half-disk is connected to one end of a return spring having its opposite end secured to the duct, the springs being tensioned so as to keep the half-disks deployed so long as the pressure difference between the take-off cavity and the turbine ventilation cavity remains below a predetermined threshold pressure.

In another embodiment, the half-disks are made of an elastic material and they are suitable for deforming elastically under the effect of a pressure difference between the take-off cavity and the turbine ventilation cavity, and for returning to their initial state when the pressure difference returns to zero.

The device may further include a ring mounted at the end of the duct that leads into the turbine ventilation cavity, the ring including at least one abutment that comes to bear axially against at least one of the two half-disks when the flow regulation valve is in its maximum closure position for the duct, said abutment being suitable for deforming under the effect of pressure inside the turbine ventilation cavity being higher than the pressure inside the duct, so that the flow rate regulation valve comes into axial abutment against the ring so as to close the duct completely.

Preferably, the duct does not have a diaphragm for calibrating the rate of flow inside the duct. The device of the invention serves to take the place of a flow rate calibration diaphragm as known in the prior art.

Also preferably, the duct does not have a check valve. The device of the invention can also take the place of a check valve as known in the prior art.

The invention also provides a turbomachine including a device as defined above.

BRIEF DESCRIPTION OF THE DRAWINGS

Other characteristics and advantages of the present invention appear from the following description made with reference to the accompanying drawings that show embodiments having no limiting character. In the figures:

FIGS. 2A and 2B show the flow rate regulation valve of the device of FIG. 1 in its maximum closure position for the duct, shown respectively in longitudinal section and in cross-section;

FIGS. 3A and 3B show the flow rate regulation valve of the device of FIG. 1 in its minimum closure position for the duct, shown respectively in longitudinal section and in cross-section.

DETAILED DESCRIPTION OF EMBODIMENTS

Figure 1:
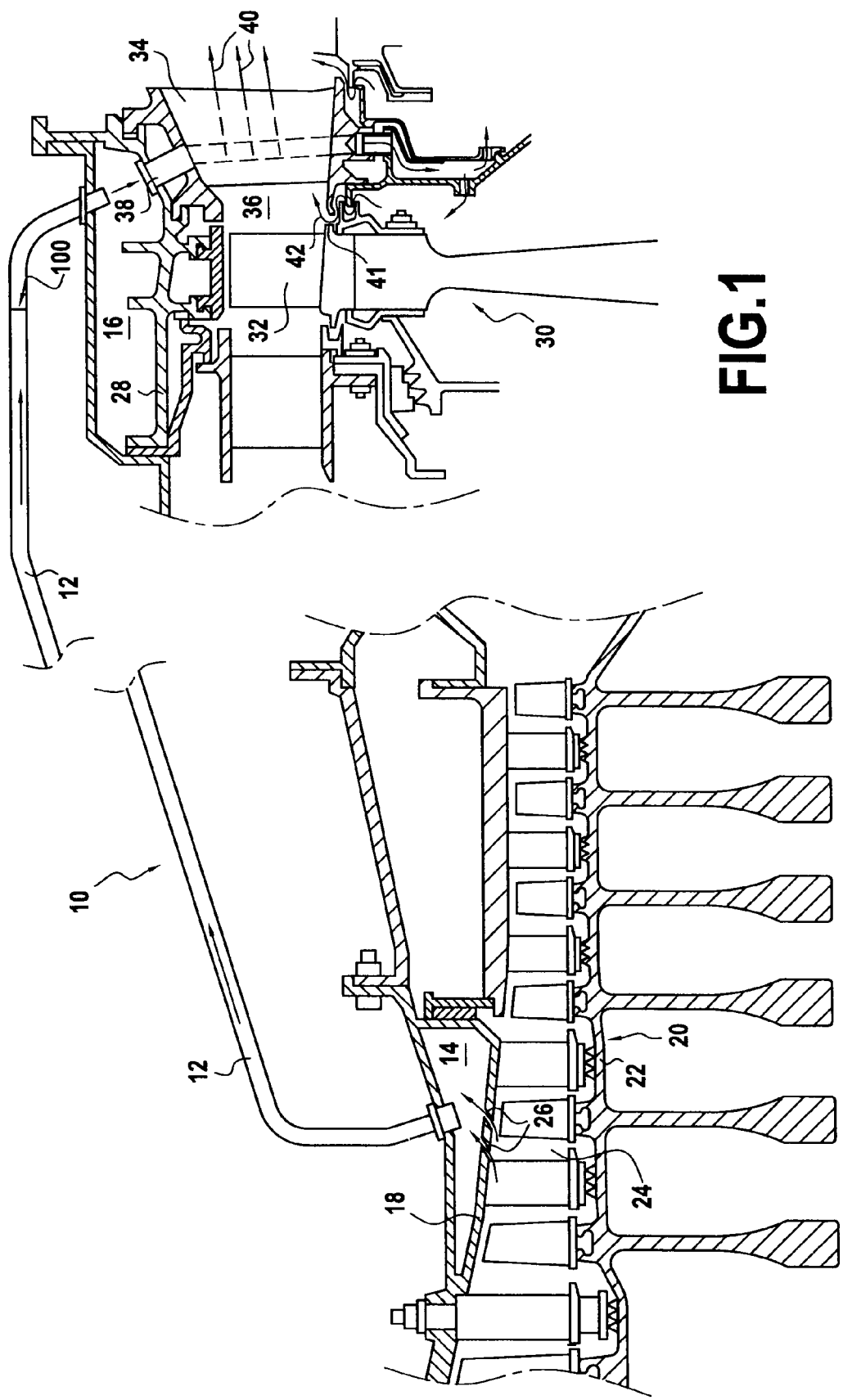
FIG. 1 is a view of an embodiment of a device in accordance with the invention, and shown in its environment.

FIG. 1 shows a portion of a device 10 in accordance with the invention for regulating the flow of air that is to purge and cool certain parts of high and low pressure turbines in an aviation turbomachine.

Naturally, the invention applies more generally to any air take-off device made by means of tubes and presenting pressure differences between the air take-off zone and the air re-insertion zone.

The device of the invention comprises a plurality of tubular ducts 12 (only one is shown in FIG. 1), each duct opening at an upstream end into a take-off cavity 14 and leading at an opposite, downstream end to a turbine ventilation cavity 16.

The take-off cavity 14 is an annular cavity formed around the outer shroud 18 of the high stream compressor 20 of the turbomachine. An inner shroud 22 disposed concentrically inside the outer shroud co-operates therewith to define a flow passage 24 for a stream of air passing through the high pressure compressor. The take-off cavity 14 communicates with this flow passage 24 via a plurality of air take-off orifices 26 (or via a slot) formed through the outer shroud 18 of the compressor.

By way of example, the air taken off by the orifices 26 comes from the fourth stage of the high pressure compressor. The pressure $P_1$ that exists inside the take-off cavity 14 is a function of the operating speed of the turbomachine: it may thus lie in the range 4 bars at cruising speed and 12 bars at full throttle.

The turbine ventilation cavity 16 is likewise an annular cavity that is formed around an outer casing 28 of the high pressure turbine 30 of the turbomachine. The high pressure turbine is made up in particular of a plurality of moving blades 32 disposed upstream from a plurality of stationary vanes 34 forming a nozzle. The moving blades and the stationary vanes are disposed in a flow passage 36 for a stream of gas passing through the turbine.

The air inside the turbine ventilation cavity 16 is at a pressure $P_2$ lower than the pressure $P_1$ inside the take-off cavity 14. By way of example, the pressure $P_2$ may vary over the range 2 bars at cruising speed to 6 bars at full throttle.

Given this pressure differential, air present inside the turbine ventilation cavity 16 passes through each stationary vane 34 of the high pressure turbine by passing through bushings 38 mounted therein. This air fraction contributes to cooling the stationary vanes 34 prior to being injected into the passage 36 (arrows 40). Some of the remaining air that is exhausted from the stationary vanes via their roots penetrates into the passage 36 via clearance 41 that exists between the bottom platforms of the fixed vanes and the moving blades (arrow 42) in order to "purge" the high pressure turbine.

Furthermore, a flow rate regulation valve 100 is located inside at least one of the tubular ducts 12. Under the effect of the pressure difference between the take-off cavity 14 and the turbine ventilation cavity 16, the valve is suitable for moving between a maximum closure position for the duct in which a minimum rate of air flow passes the valve (FIGS. 2A and 2B) and a minimum closure position for the duct in which a maximum rate of air flow passes through the valve (FIGS. 3A and 3B).

In the embodiment shown in FIGS. 2A-2B and 3A-3B, the valve 100 is in the form of a disk that is centered on the longitudinal axis X-X of the duct 12 in which it is located. More precisely, the valve behaves like two half-disks 102 that are mounted to pivot on a rigid shaft 104, this shaft being secured to the duct 12 and extending across it (FIGS. 2B and 3B).

Depending on the pressure difference between the take-off cavity and the turbine ventilation cavity, the half-disks 102 are suitable for deploying in a plane extending substantially transversely relative to the duct 12 when the valve is in its maximum closure position for the duct (FIGS. 2A and 2B) and of folding downstream into a substantially longitudinal plane of the duct when the valve is in its minimum closure position for the duct (FIGS. 3A and 3B).

When the half-disks 102 are deployed (FIGS. 2A and 2B), they form a disk of diameter D1 that is less or equal to the diameter D2 of the duct 12. Thus, when the diameter D1 is less than the diameter D2, the regulation valve makes it possible, in the maximum closure position for the duct, for some minimum flow of air to pass through the valve by going round it (FIG. 2A) so as to feed the turbine ventilation cavity with air.

Having a non-zero, residual flow section even when the flow rate regulation valve is in its maximum closure position presents at least two advantages. In the event of one or more of the valves jamming and remaining blocked in the maximum closure position, the residual flow section still allows some minimum flow rate of air to pass and thus provide some minimum level of ventilation (purging and cooling) for turbines at full throttle. Furthermore, in the event of the pressure difference between the take-off cavity and the turbine ventilation cavity reaching the threshold from which the valve begins to tilt, only above cruising speed (speed for which the closure thus remains at its maximum), the residual flow section allows some minimum flow rate of air to pass at cruising speed so as to ventilate the turbine.

Mechanical return means are also provided to hold the valve 100 in its maximum closure position for the duct so long as the pressure difference between the take-off cavity and the turbine ventilation cavity remains below a predetermined pressure threshold $P_S$.

Thus, in the embodiment of FIGS. 2A-2B and 3A-3B, the mechanical means take the form of two return springs 106, each return spring being fastened at one end to the rigid shaft 104 and at the opposite end to the upstream face of one of the half-disks 102. Each spring is tensioned so as to keep the half-disks deployed (i.e. in the position shown in FIGS. 2A-2B) so long as the pressure difference between the take-off cavity and the turbine ventilation cavity remains below the threshold pressure $P_S$. Thus, the springs 106 exert a return force on the half-disks preventing them from deploying so long as the pressure difference between the take-off cavity and the turbine ventilation cavity remains below the threshold pressure $P_S$.

The pressure chosen for the threshold pressure $P_S$ is associated with the pressures that exist inside the take-off and turbine ventilation cavities at various operating points of the turbomachine, and in particular at cruising speed and at full throttle.

Changeover from the maximum closure position to the minimum closure position may occur almost instantaneously when the pressure difference between the take-off cavity and the turbine ventilation cavity reaches the threshold pressure $P_S$. Alternatively, this changeover from one extreme position to the other may take place progressively when the pressure difference between the take-off cavity and the turbine ventilation cavity reaches and then exceeds the threshold pressure $P_S$.

For almost instantaneous changeover from the maximum closure position to the minimum closure position, the threshold pressure $P_S$ is selected to lie in the range 2 bars to 6 bars (using the above-mentioned numerical examples for the pressures $P_1$ and $P_2$).

By selecting a value that is less than or equal to 2 bars for $P_S$ (difference $P_1-P_2$ equal to 2 bars for cruising speed), the valve will be in its minimum closure position for the duct once cruising speed is reached, which is not the intended object since there would then be a constant flow section from cruising speed up to full throttle. In contrast, by selecting a value lying in the range 2 bars to 6 bars for $P_S$, the valve will be in its maximum closure position for the duct at cruising speed and in its minimum closure position for the duct at full throttle (difference $P_1-P_2$ equal to 6 bars for full throttle). The maximum closure position for the duct at cruising speed makes it possible to reduce the air flow rate and optimize fuel consumption.

When changeover from the maximum closure position to the minimum closure position is progressive, the threshold pressure $P_S$ may be selected to lie in the range 0 bars and a value that is less than 6 bars (using the same above-mentioned numerical examples for the pressures $P_1$ and $P_2$). Under such circumstances, the valve may return to its minimum closure position for the duct at full throttle (where the difference $P_1-P_2$ is equal to 6 bars).

As a result, at cruising speed, the valve may still be in the maximum closure position for the duct (if the threshold pressure $P_S$ lies in the range 2 bars to 6 bars) or it may be in a position intermediate between the maximum closure position and the minimum closure position (if the threshold pressure $P_S$ lies in the range 0 to 2 bars).

In both variant embodiments (changeover from one extreme position to the other being almost instantaneous or else being progressive), the diameter D1 of the valve that calibrates the minimum air flow rate feeding the turbine ventilation cavity is selected as a function of the threshold pressure $P_S$ so as to convey air at a flow rate sufficient for purging the turbines, and if necessary for cooling them, at all operating points, even in the event of a breakdown (e.g. in the event of a valve breaking down and remaining jammed in its maximum closure position for the duct or in the event of an engine breakdown that affects the turbine ventilation flow rate levels).

Furthermore, the mechanical return means enabling the valve to be held in its maximum closure position for the duct may be of some other kind. For example, in a variant embodiment (not shown in the figures), the half-disks could be made of an elastic material capable of deforming under pressure and returning to its initial shape when the pressure difference between the take-off cavity and the turbine ventilation cavity returns to zero (the half-disks thus being subjected to elastic deformation). In another variant embodiment (not shown), the half-disks could be held in the deployed position by means of hinges made of an elastic material or else by using elastic damper type elements (instead of the springs of the embodiment shown).

Furthermore, with the air flow regulation device of the invention, the ducts advantageously do not have a flow rate calibration diaphragm of the kind known in the prior art.

Figure 4A:
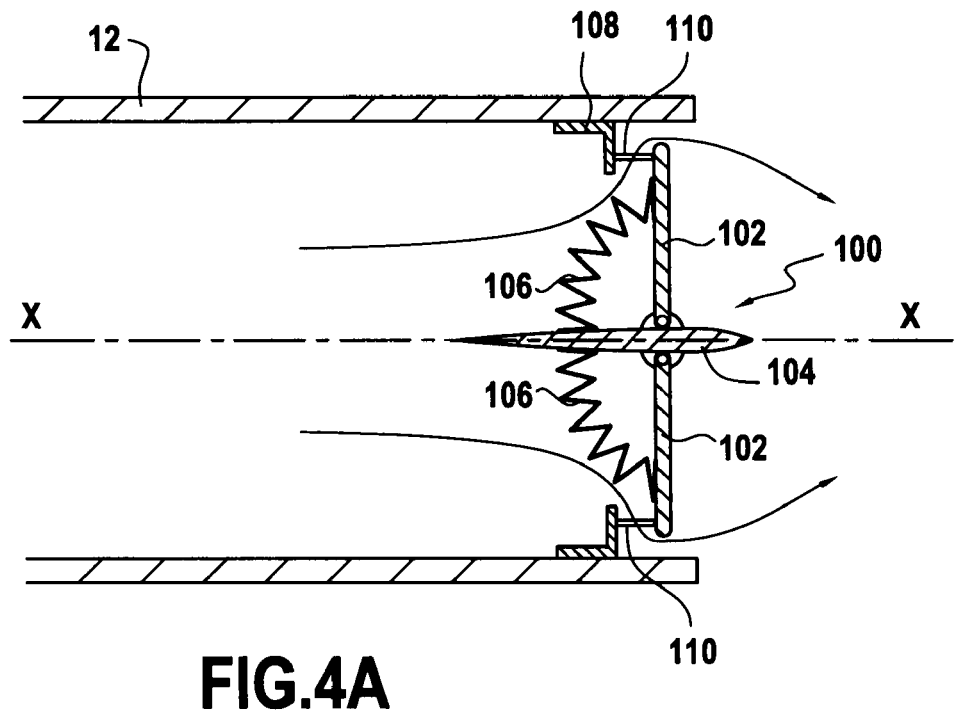
FIGS. 4A and 4B are a longitudinal section of a regulation valve in a variant embodiment and shown in two different closure positions.
Figure 4B:
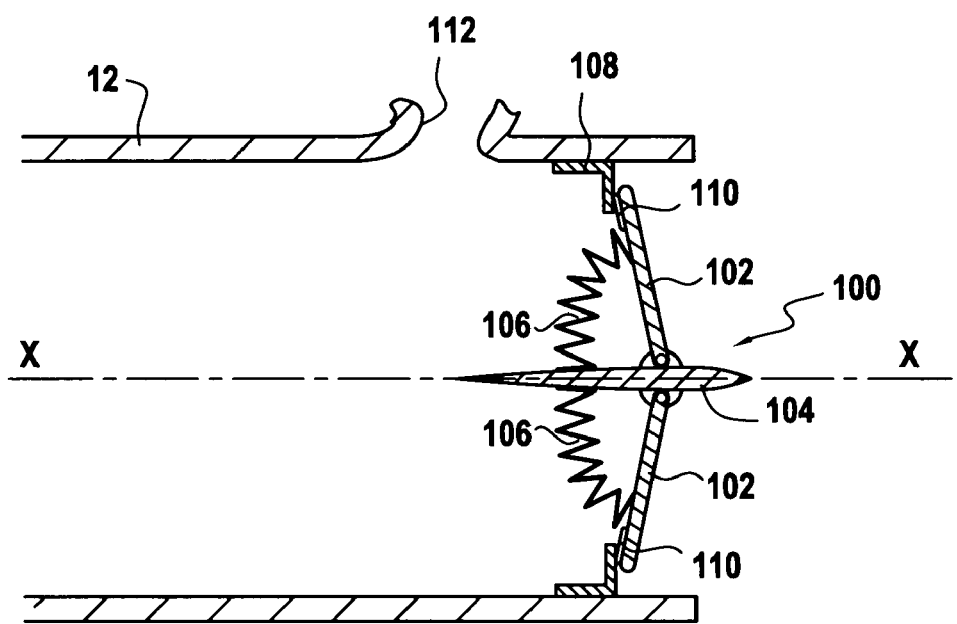

With reference to FIGS. 4A and 4B, there follows a description of a variant embodiment of the air flow rate regulation device of the invention.

In this variant, the valve 100 also acts as a check valve. The valve is located at the downstream end of the duct leading into the turbine ventilation cavity and it is provided with means for closing the duct 12 completely when the pressure $P_3$ inside the duct becomes sufficiently small relative to the pressure $P_2$ inside the turbine ventilation cavity.

More precisely, a ring 108 is mounted at the downstream end of the duct that leads into the turbine ventilation cavity. This ring includes two axial abutments 110, each abutment coming to bear axially against one of the two half-disks 102 when the flow rate regulation valve is in its maximum closure position for the duct (FIG. 4A). Naturally, the number of axial abutments per half-disk could be greater in order to distribute forces better.

Furthermore, the abutments 110 act as fuses: when the pressure $P_2$ inside the turbine ventilation cavity becomes greater than the pressure $P_3$ inside the duct 12 by a sufficient amount, the half-disks 102 of the valve deform the abutments, which buckle under this mechanical force so that the half-disks come into axial abutment against the ring, thereby completely closing the duct 12 (FIG. 4B). In this position, no flow of air passes through the valve (ignoring leaks).

In the event of the duct 12 being accidentally broken (represented by a hole 112 in FIG. 4B), e.g. as the result of the thermal and vibrational stresses to which the duct is subjected, the pressure $P_3$ inside the duct drops so as to become well below the pressure $P_2$ inside the turbine ventilation cavity (in general, the pressure $P_3$ inside the duct is then close to atmospheric pressure). From this moment, the valve 100 of the device constituting this embodiment of the invention closes the duct 12 completely at its downstream end (FIG. 4B), thereby preventing the flow of gas that is flowing in the passage through the turbine escaping therefrom and passing via the break 112 in the duct so as to spread out in the core compartment of the turbomachine, with the danger of damaging the various pieces of equipment that are installed therein (for example valves or electronics units).

The use of a valve as described with reference to this embodiment makes it possible to avoid having recourse to a check valve of the kind known in the prior art.

It should be observed that the number, the shape, the stiffness, and the locations of the axial abutments of the device in this embodiment may vary depending on application conditions.

More generally, the shape of the valve of the air flow regulation device of the invention may differ from that described with reference to the embodiments of FIGS. 2A-2B to 4A-4B.

What is claimed is:

1. A device for regulating the flow rate of air feeding a turbine ventilation cavity of a turbomachine turbine section, comprising:

at least one tubular duct opening out at one end into a take-off cavity communicating with a flow passage for a stream of air in a compression section of the turbomachine and leading at an opposite end into a turbine ventilation cavity that communicates with a flow passage for a gas stream in a turbine section of the turbomachine, a pressure inside the take-off cavity being higher than a pressure inside the turbine ventilation cavity;

a flow rate regulation valve disposed in the tubular duct, the valve presenting the form of a disk centered on the longitudinal axis of the duct, being made up of two half-disks of diameters that are pivotally mounted on a rigid shaft that is secured to the duct and that extends transversely relative thereto, and being suitable for moving under the effect of a pressure difference between the take-off cavity and the turbine ventilation cavity between a maximum closure position for the duct in which the half-disks are deployed in a plane extending substantially transversely across the duct so that some non-zero minimum air flow rate passes through the valve, and a minimum closure position for the duct in which the half-disks retract into a plane lying substantially longitudinally relative to the duct so that a maximum air flow rate passes through the valve;

mechanical return means for holding the valve in its maximum closure position for the duct so long as the pressure difference between the take-off cavity and the turbine ventilation cavity remains below a predetermined threshold pressure; and a ring mounted at the end of the duct that leads into the turbine ventilation cavity, the ring including at least one abutment that comes to bear axially against at least one of the two half-disks when the flow rate regulation valve is in its maximum closure position for the duct, said abutment being suitable for deforming under the effect of a pressure inside the turbine ventilation cavity that is higher than the pressure inside the duct so that the flow regulation valve comes into axial abutment against the ring so as to close the duct completely.

2. A device according to claim 1, wherein each half-disk is connected to one end of a return spring, an opposite end of said return spring being secured to the rigid shaft, the return springs being tensioned so as to hold the half-disks deployed so long as the pressure difference between the take-off cavity and the turbine ventilation cavity remains below a predetermined threshold pressure.

3. A device according to claim 1, wherein the duct does not have a diaphragm for calibrating the flow rate passing inside the duct.

4. A device according to claim 1, wherein the duct does not have a check valve.

5. A turbomachine including a device according to claim 1.

6. A device according to claim 1, wherein an outer diameter of the disk of the flow regulation valve comes into axial abutment against the ring when the pressure inside the turbine ventilation cavity is higher than the pressure inside the duct.

* * * * *